United States Patent [19]

Wills et al.

[11] Patent Number: 4,636,781

[45] Date of Patent: Jan. 13, 1987

[54] HOUSING FOR DATA TERMINAL DEVICE

[75] Inventors: David C. Wills; Donald E. Landis; Dale R. Lyons, all of Cambridge, Ohio

[73] Assignee: NCR Corporation, Dayton, Ohio

[21] Appl. No.: 749,358

[22] Filed: Jun. 27, 1985

[51] Int. Cl.⁴ ............................................. G05G 1/00
[52] U.S. Cl. ................................... 340/700; 361/390; 312/208
[58] Field of Search ...................... 340/700, 716, 407; 248/553, 27.1, 1 A–1 J; 361/331, 344, 380, 390; 312/215, 7.2, 196, 208, 236; 200/61.64, 43.1; 70/262, 337, 336, 344, 448, 77, 78

[56] References Cited

U.S. PATENT DOCUMENTS

| | | | |
|---|---|---|---|
| 3,340,441 | 9/1967 | Probert | 317/120 |
| 4,002,955 | 1/1977 | Eggert et al. | 317/120 |
| 4,073,000 | 2/1978 | Krejsa | 361/344 |
| 4,168,870 | 9/1979 | Hill | 361/390 X |
| 4,496,943 | 1/1985 | Greenblatt | 340/700 X |
| 4,571,456 | 2/1986 | Paulsen et al. | 340/700 X |
| 4,600,249 | 7/1986 | Anderson et al. | 312/196 |

Primary Examiner—Gerald L. Brigance
Assistant Examiner—Vincent P. Kovalick
Attorney, Agent, or Firm—Wilbert Hawk, Jr.; Albert L. Sessler, Jr.; Richard W. Lavin

[57] ABSTRACT

A structure for housing a data terminal device having a printer and a disk drive memory unit includes a rear portion having a cover member covering the printer and a display member rotatably mounted on a front portion of the housing structure for movement to a viewing position covering the front end of the disk drive member from view. A locking mechanism is included to allow the cover member to be unlocked using a first key member and for unlocking the display member from the viewing position using a second key member wherein the display member is moved to a position allowing access to the disk drive memory unit to occur.

19 Claims, 5 Drawing Figures

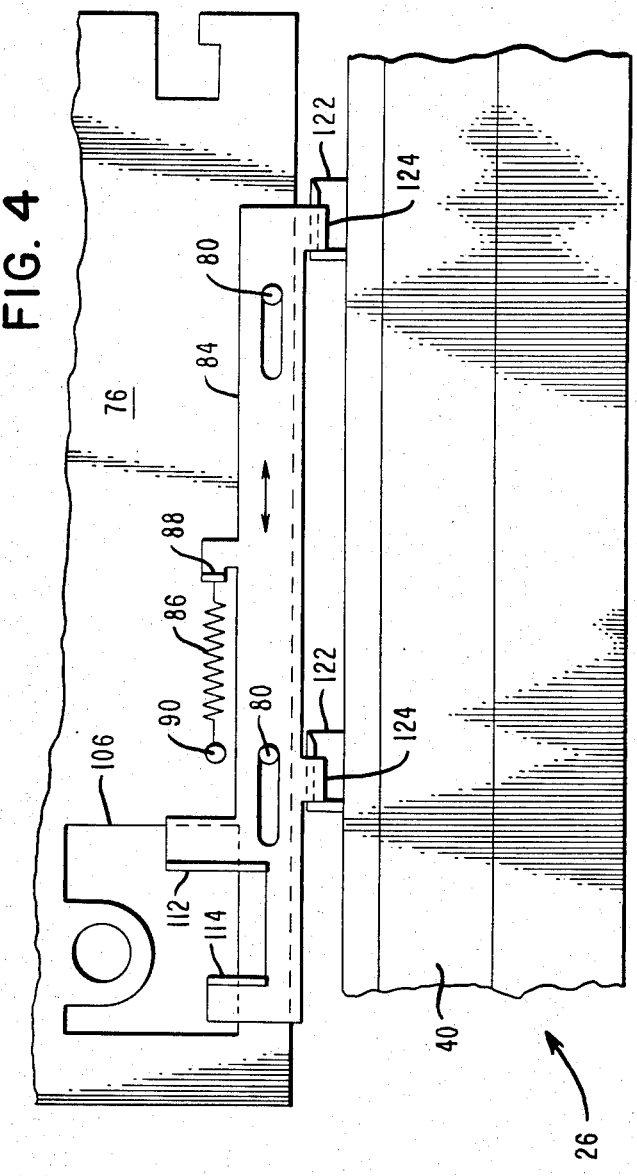
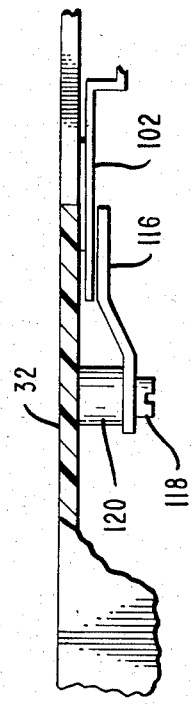

4,636,781

HOUSING FOR DATA TERMINAL DEVICE

BACKGROUND OF THE INVENTION

The present invention is directed to data terminal devices and more particularly to the housing for a data terminal device having a disk drive mounted within the housing of the terminal device.

Floppy disk memories have been used for several years as memory devices for mini-computer systems. When used in computer systems, the floppy disk drives are typically mounted with the face of the drive units exposed, either integrated into the computer cabinet or mounted in a separate cabinet as a memory unit. In recent years the use of floppy disk memory devices in Point of Sales (POS) terminal systems has increased. POS data terminal devices of integrated design are typically very tightly packaged to minimize the size of the terminal and still provide some space for all the necessary modules such as printers, keyboard, display, cash drawer, power supply and electronics. Since floppy disk drive modules must be accessed to change the disks, they compete for space with the printers, displays, keyboards and other devices which requires a physical intervention by the operator as part of their operation. These devices cannot be buried within a terminal like a power supply or printed circuit board. For this reason, floppy disk drive modules used with POS terminal systems have typically been mounted in their own cabinets separate from the data terminal device. When POS data terminal devices are used in sensitive areas where the data contained on the floppy disks is not to be tampered with, security requirements become very important in the purchase of such terminal systems.

It is thus a principal object of this invention to provide a housing structure for a data terminal device which allows a disk drive memory unit to be incorporated within the terminal device.

It is another object of this invention to provide a locking arrangement for a terminal housing structure allowing such housing structure to be removed for access to the disk drive memory unit only under the control of supervisory personnel.

It is a further object of this invention to provide a housing structure for a data terminal device which enables a disc drive memory unit to be located within the terminal as to be hidden from view.

It is another object of this invention to provide a housing structure for a data terminal device which includes a display member movable to a position covering the location of the disc drive memory unit within the housing structure.

SUMMARY OF THE INVENTION

These and other objects of the invention are accomplished by providing a housing structure for a data terminal device in which the terminal device includes a pair of disk drive memory units and a hingedly mounted display member positioned adjacent the front portion of the disk drive units. The display member is mounted on the housing structure for movement to a locking position covering the front of the disk drive units preventing the viewing of the disk drive units within the terminal device. A two key locking mechanism is provided which, when actuated through a first movement, allows the operator of the terminal device using a first key member to release a cover member of the housing structure for movement to a position exposing the printing mechanism associated with the terminal device. The locking mechanism is further constructed to allow supervisory personnel using a second key member to actuate the locking mechanism through a second movement to release the display member for movement to a position exposing the front of the disk drive units allowing the disk members associated with the drive units to be inserted therein or removed.

BRIEF DESCRIPTION OF THE DRAWINGS

FIG. 4 is a partial top view of a portion of the locking mechanism engaging the display assembly to lock the assembly in its viewing position.

FIG. 5 is a partial side view of a portion of the locking mechanism engaging the printer cover member in a closed position.

DESCRIPTION OF THE PREFERRED EMBODIMENT

Figure 1:
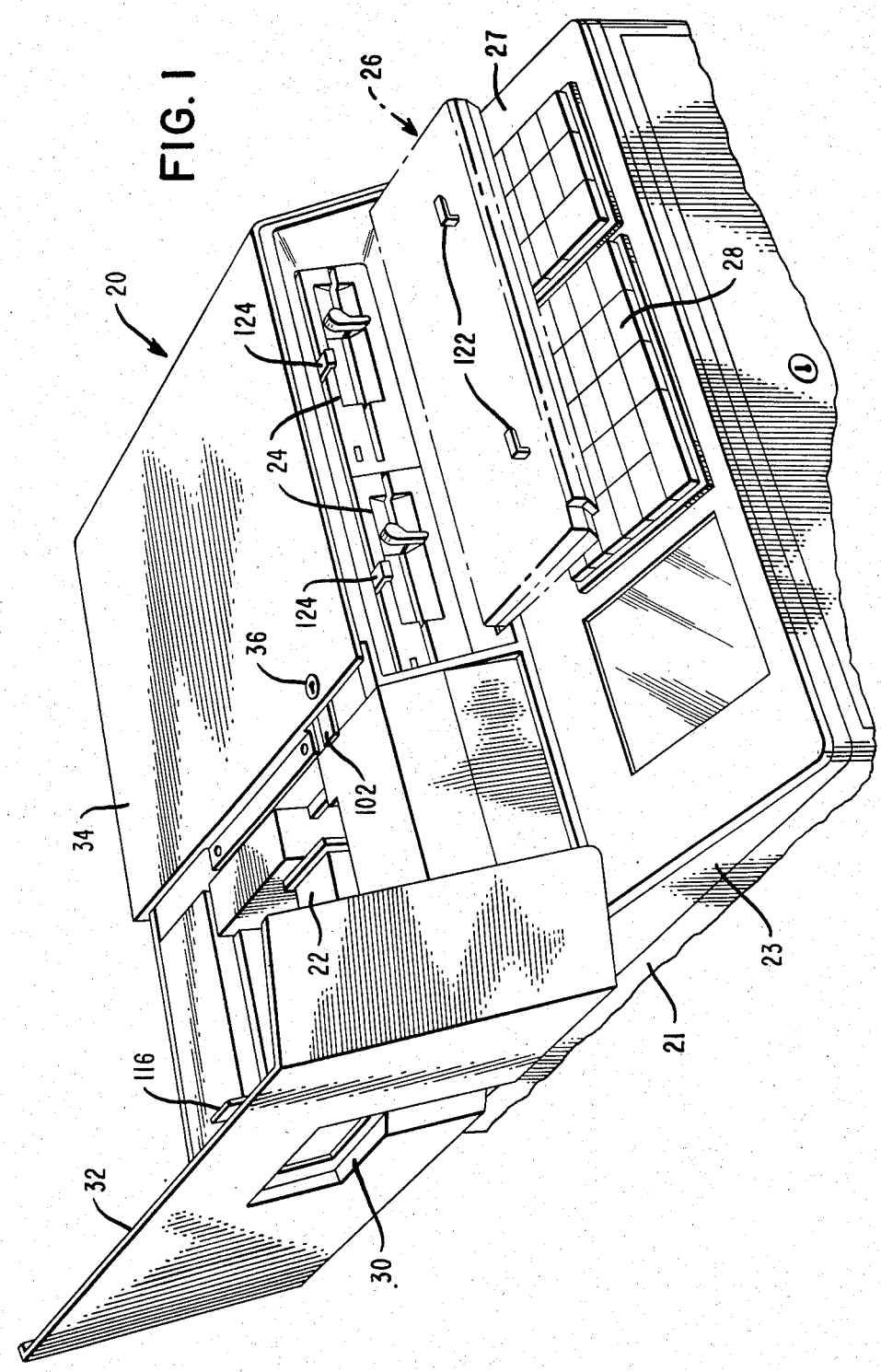
FIG. 1 is a perspective view of the terminal device showing the printer cover member and the display assembly in an open position.

Referring now to FIG. 1, there is shown a perspective view of a data terminal device of the present invention generally indicated by the numeral 20 which includes a printing apparatus 22 located on one side of a rear portion 21 of the housing member 23 enclosing the terminal device, a pair of disk drive members 24 positioned adjacent the printing apparatus, a display assembly 26 hingedly mounted on a front portion 27 of the housing member 23 adjacent the front side of the disk drive members 24 and adapted for movement to a position covering the front side of the disk drive members 24 when positioned in a normal vertical viewing position thereby concealing the disk drive members 24 from view. Further included in the terminal device 20 is a keyboard 28 mounted within the front portion 27 of the housing member 23 for entering data into the terminal device 20 and a viewing station 30 located in a printer cover member 32 which forms a part of the rear portion 21 of the housing member for viewing the data printed by the printing apparatus 22 on a receipt or journal member or any other type of record member. The printer cover member 32 is hinged to the side of the rear portion 21 of the housing member 23 and is movable to an open position, as shown in FIG. 1, exposing the printing apparatus 22 enabling a journal or receipt supply roll to be installed in the printing apparatus or repairs to be made to the printing apparatus itself. The rear portion 21 of the housing member 23 further includes a second cover member 34 covering the disk drive members 24 in which is mounted a security key lock assembly 36 which sequentially unlocks the printer cover member 32 and the display assembly 26 from a locked position when operated in a manner that will be described more fully hereinafter.

Figure 2:
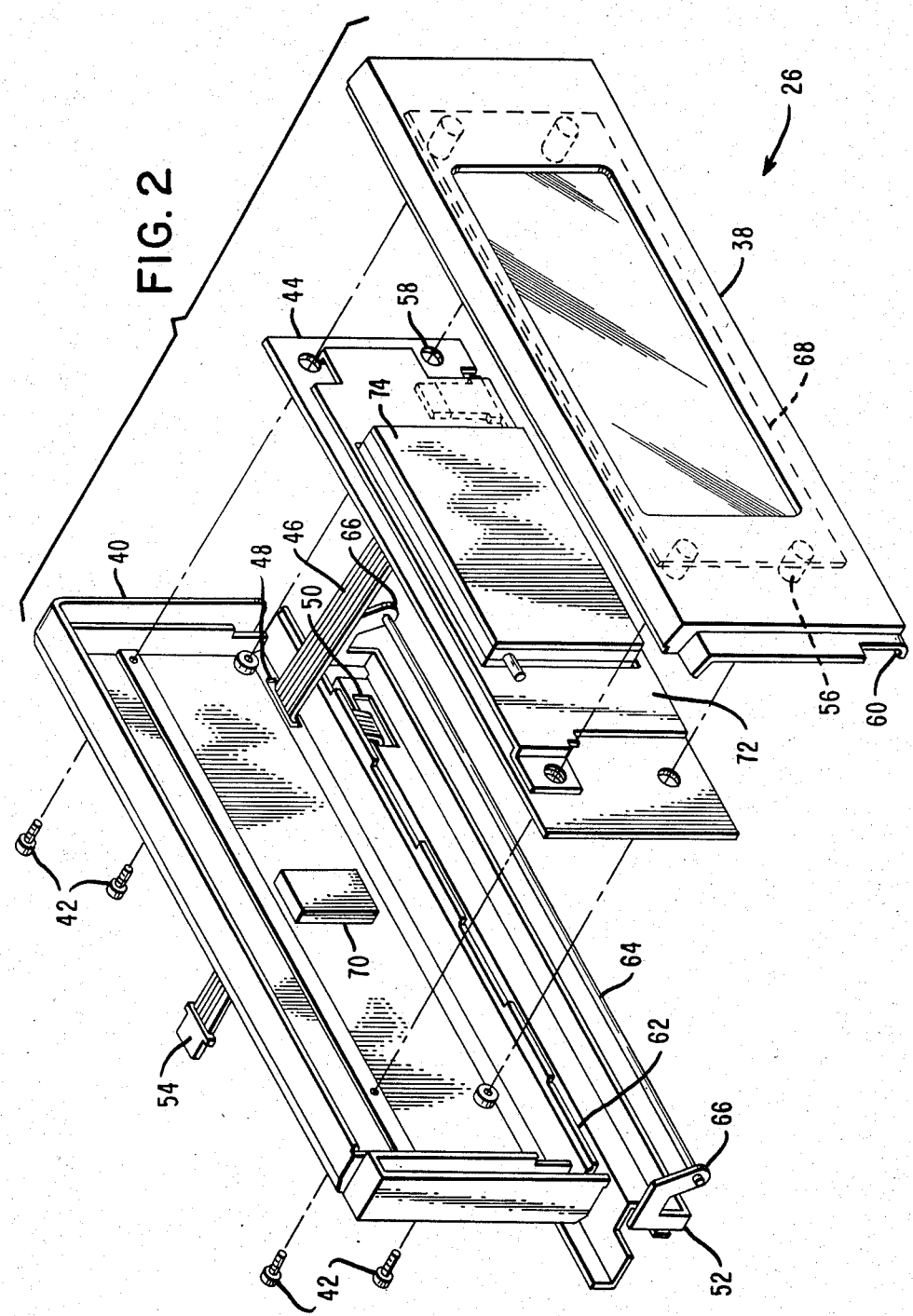
FIG. 2 is an exploded perspective view of the display assembly of the present invention.

Referring now to FIG. 2, there is shown an exploded view of the display assembly 26 (FIG. 1). Included in the assembly are front 38 and back 40 injection molded thermalplastic shell members which are held together by screws 42. Mounted between the shell members 38, 40 is a vacuum fluorescent display panel 44 operated in a manner which is well known in the art by electrical signals transmitted over a ribbon cable 46 connected to the panel 44 and which extends through a slot 48 located in the back shell member 40 of the display assembly 26. The ribbon cable 46 further extends through a slot 50 located in a frame member 52 which is part of the terminal device 20 and is then connected to a processing member (not shown) located in the terminal device by means of the cable connector member 54. The cable 46 is a flat cable which flexes to allow the display assembly 26 to move between an open and closed position.

In assembling the shell members 38, 40 and the display panel 44, the panel 44 utilizing the apertures 58 is positioned on studs 56 secured to the front shell member 38. The front shell member 38 is then secured to the back shell member 40 by means of screws 42. During this assembly, a lower lip portion 60 of the front shell member 38 coacts with a similar lip portion 62 of the back shell member 40 to capture a pin 64 secured between two arm portions 66 of the frame member 52. This arrangement enables the display assembly to be rotated between a closed position covering the front side of the disk drive members 24 and an open position (FIG. 1) enabling disk members to be removed or inserted into the disk drive members 24. Further included in the display assembly 26 is a display window 68, a foam pad 70 which holds the panel 44 against the display window 68 to compensate for manufacturing tolerances and a safety shield 72 preventing the display element 74 from being damaged.

Figure 3:
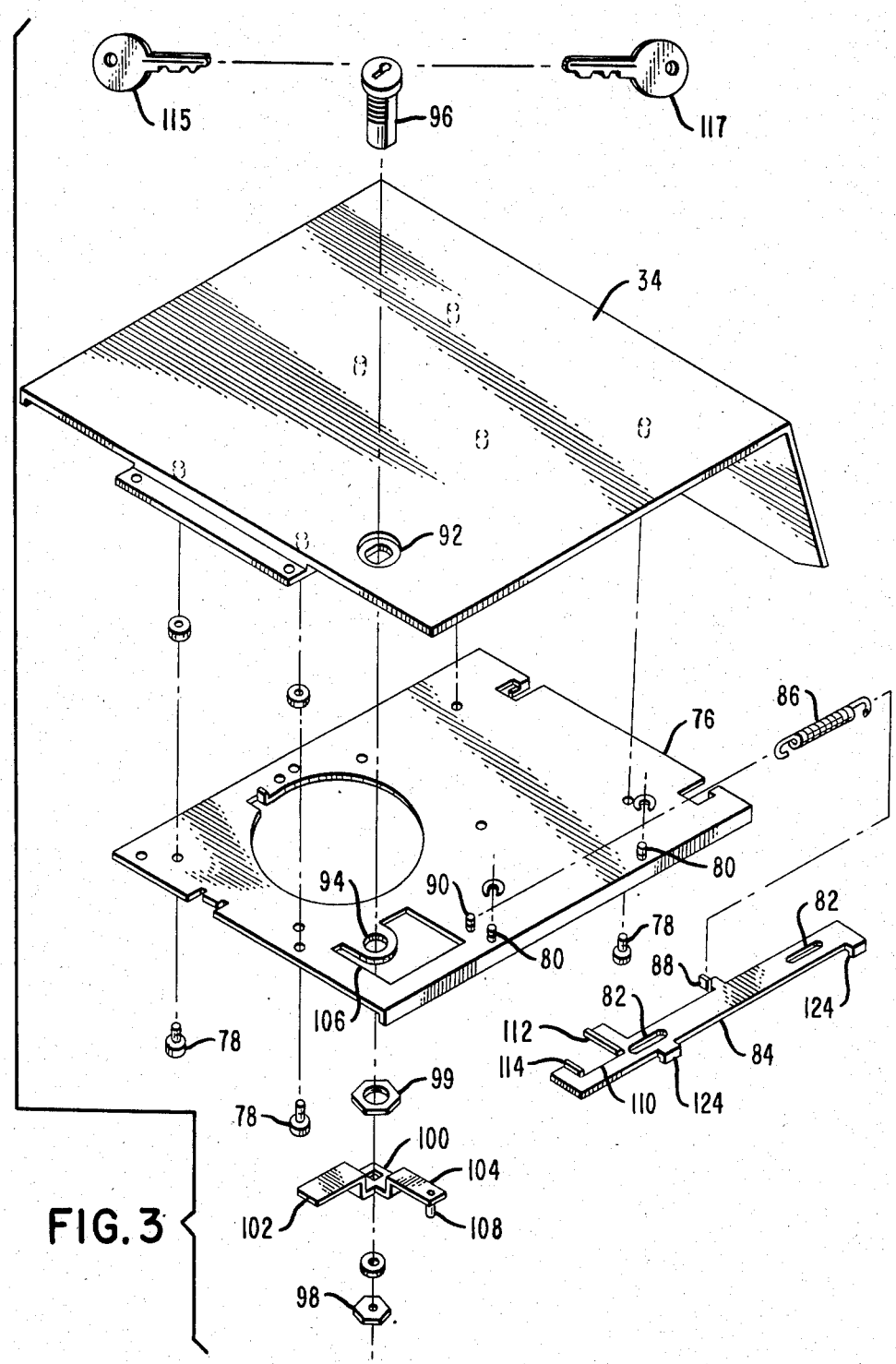
FIG. 3 is an exploded view of a portion of the terminal device showing the details of the locking mechanism.

Referring now to FIG. 3, there is shown a fragmentary exploded view of the locking mechanism employed in the present invention. Secured to the top of the terminal device 20 adjacent the disk drive members 24 is a EMI/RFI metal shield member 76 to which is attached the cover member 34 (FIG. 1) by means of screw members 78. Secured to the shield member 76 are a pair of stud members 80 which are positioned within a pair of slots 82 located in a latch member 84 associated with the shield member 76. The latch member 84 is slidably positioned on the shield member 76 and is normally biased in a leftward direction as viewed in FIG. 3 by a spring 86 secured between a tang portion 88 of the latch member 84 and a stud 90 secured to the shield member 76.

Positioned within an aperture 92 in the cover member 34 and extending through an aligned aperture 94 in the shield member 76 is the two position lock assembly 36 (FIG. 1) comprising a cam lock member 96 secured by means of the nuts 98 and 99 to an actuating member 100 having first 102 and second 104 arm members. The arm members 102, 104 extend through a cut-out portion 106 of the shield member 76. A depending stud member 108 secured to the arm member 104 is positioned within a recessed portion 110 of the latch member 84 adjacent a pair of cam surfaces 112 and 114 located on opposite edges of the recessed portion 110. The cam lock member which may comprise an Illinois Lock Part Number 0061007347 and which is commercially available from the Illinois Lock Corporation of Wheeling, Ill., is capable of being rotated by a first key member 115 forty-five degrees in a counter-clockwise direction to unlock the printer cover member 32 (FIG. 1) and an additional forty-five degrees in the same direction by a second key member 117 to unlock the display assembly 26 (FIG. 1). In the present embodiment, the terminal device operator has possession of the first key member 115 to operate the cam lock member 96 in the first forty-five degree movement while a manager or other type of supervisory person has possession of the second key member 117 to operate the cam lock member in the second forty-five degree operation to unlock the display assembly 26 for movement to an open position. During the first forty-five degree rotation of the lock member, the arm member 102 is rotated from engagement with a depending bracket member 116 (FIGS. 1 and 5) secured by means of a screw member 118 to a support member 120 which in turn is secured to the underside of the printer cover member 32. This counter-clockwise movement of the arm member 102 releases the cover member 32 for movement by the operator to the open position shown in FIG. 1. During this movement, the arm member 104 (FIG. 3) is rotated to position the stud member 108 adjacent the cam surface 112.

In the second forty-five degree rotation of the cam lock member 96, the stud member 108 (FIG. 3) secured to the arm member 104 will engage the cam surface 112 of the latch member 84 moving the latch member to the right as viewed in FIGS. 3 and 4 against the action of the spring member 86. As best seen from FIG. 4, there is secured to the back shell member 40 of the display assembly a pair of open-ended catch members 122 which, when the assembly 26 is moved to a vertical or closed position, will be in a position to be engaged by a pair of depending tab portions 124 (FIGS. 1, 3 and 4) of the latch member 84 under the action of the spring member 86. Upon the movement of the arm member 104 in a counter-clockwise direction during the second forty-five degree movement of the cam lock member 96 in the manner described above, the latch member 84 is moved in a direction by the stud member 108 to remove the tab portions 124 from engagement with the catch members 122 allowing the display assembly 26 to be rotated in a direction to the position shown in FIG. 1 uncovering the front side of the disk drive members 24. Upon release of the cam lock member 96 by the operator, the spring 86 (FIG. 3) will move the latch member 84 in a leftward direction as viewed in FIG. 4 to its home position. If at this time, the display assembly 26 has been returned to its upright position covering the front side of the disk drive members 24 from view, the leftward movement of the latch member 84 will allow the tab portions 124 of the latch member 84 to latch the catch members 122 thereby holding the assembly 26 in its upright position. If because of manufacturing tolerances, an interference occurs between the tab portions 124 and the catch members 122 as to prevent the spring 86 from moving the latch member 84 to a position latching the display assembly 26 in a vertical position, the stud member 108 will engage the cam surface 114 moving the latch member to a latching position.

It will be seen from the description of the invention that the terminal housing prevents anyone from sensing the presence of the disk drive members with respect to the terminal device while the locking system allows access to both the printer mechanism and the disk drive members to occur under the control of only those persons authorized to have access to such members.

While the principles of the invention have now been made clear in an illustrated environment, it will be obvious to those skilled in the art that many modifications of structure, arrangements, elements and components can be made which are particularly adapted for specific environments and operating requirements without departing from those principles. The appended claims are therefore intended to cover and embrace any such modifications, within the limits of only the true spirit and scope of the invention.

We claim:

1. A processing terminal including a printer, a keyboard and a disk drive memory unit comprising:
   a housing structure having a first portion enclosing the printer and the disk drive memory unit and a second portion enclosing the keyboard, said first portion including a movable cover member covering the top of the printer when in a closed position;
   a display member movably coupled to the second portion of the housing structure adjacent the front side of the disk drive memory unit for movement between a viewing and open position, said display member covering the front side of the disk drive memory unit when in a viewing position;
   and locking means engaging said cover member and said display member to lock said cover member when the cover member is in a closed position and said display member when the display member is in a viewing position, said locking means adapted to be moved through a first predetermined distance releasing said cover member for movement to a position exposing the printer and through a second predetermined distance releasing said display member to a position exposing the front side of the disk drive memory unit.

2. The data processing terminal of claim 1 which further includes first latching means secured to said cover member and said locking means includes a first actuating member normally engaging said first latching means to hold said cover member in a locked position whereby upon movement of the locking means through said the first predetermined distance, said first actuating member is moved to a position releasing said cover member for movement to an open position.

3. The data processing terminal of claim 2 which further includes second latching means secured to said display member and said locking means includes holding means for engaging said second latching means for holding said display member in a viewing position and a second actuating member engaging said holding means whereby upon movement of said locking means through said second predetermined distance, said second actuating member is moved to a position disabling said holding means from engaging said second latching means thereby enabling said display member to be moved to an open position exposing the front side of said disk drive memory unit.

4. The data processing terminal of claim 3 in which said locking means includes a cam member rotatable in a direction through said first predetermined distance under control of a first key member whereby said first actuating member is moved to a position releasing said cover member for movement to an open position.

5. The data processing terminal of claim 4 in which said cam member is rotatable in said direction through said second predetermined distance under control of a second key member wherein said second actuating member is moved to a position disabling said holding means.

6. The data processing terminal of claim 5 in which said first latching means includes a depending latch member secured to the underside of said cover member and said first actuating member comprises a first arm member movable to a position between the depending latch member and the cover member when the cam member is in a home position thereby locking the cover member in a closed position.

7. The data processing terminal of claim 6 in which said second latching means includes a catch member secured to the back surface of the display member and said holding means includes an elongated latching member slidably positioned adjacent the front end of said disk drive memory unit for normally engaging said catch member when the cam member is in a home position, and said second actuating member is positioned adjacent said latching member, whereby upon movement of the cam member through said second predetermined distance, said second actuating member slides said latching member to a position releasing the catch member enabling the display member to be removed from a position blocking the front end of said disk drive memory unit.

8. The data processing terminal of claim 7 in which said holding means includes a resilient member engaging said latching member for normally urging said latching member to a latched position, said latching member includes a recessed portion having a first cam surface in which is positioned said second actuating member whereby upon movement of said cam member through said second predetermined distance, said second actuating member engages said first cam surface thereby sliding the latching member against the action of said resilient member to a disabled position.

9. The data processing terminal of claim 8 in which said second actuating member comprises a second arm member and a depending stud member secured thereto and positioned within said recessed portion of the latching member, said stud member being moved to a position adjacent said first cam surface during movement of the cam member through said first predetermined distance and engaging said first cam surface during the movement of the cam member through said second predetermined distance.

10. The data processing system of claim 9 in which said recessed portion includes a second cam surface whereby upon release of the cam member from its actuating position, said stud member is moved to a position adjacent the second cam surface enabling said stud member to engage said second cam surface whereby said latching member is actuated to a home position upon failure of said resilient member to actuate said latching member.

11. The data processing system of claim 10 in which said first and second predetermined distance are consecutive substantially 45° counter-clockwise movements.

12. A housing assembly for a data terminal device having a printer, a keyboard and a disk drive memory unit comprising;
   a rear portion enclosing the printer and the disk drive memory unit and a front portion enclosing the keyboard;
   a cover member rotatably secured to said rear portion and adapted for movement between an open and closed position adjacent the printer;
   a support member secured to said rear portion of the housing assembly and located adjacent the top edge of the disk drive memory unit enclosing said disk drive memory unit;
   a display member hinged to the front portion of the housing assembly adjacent the front side of the disk drive memory unit, said display member adapted to be moved to a viewing position covering the front side of the disk drive memory from view;

and a locking assembly mounted in said support member including first actuating means engaging said cover member when said cover member is in said closed position and a second actuating means engaging said display member when the display member is in said viewing position, said locking assembly adapted to be actuated by a first key member through a first predetermined distance enabling said first actuating means to release the cover member for movement from said engaging position and through said first distance and a further second predetermined distance by a second key member enabling said second actuating means to release said display member for movement from said viewing position thereby exposing the front side of the disk drive memory unit.

13. The housing assembly of claim 12 in which said locking assembly includes a rotatably mounted cam member actuated by said first and second key members, said first actuating means includes a first arm member secured to said cam member and movable to a position latching said cover member when the cam member is in a home position and said second actuating means includes a latching member slidably mounted to said support member and movable to a home position latching the display member in said viewing position when the cam member is in a home position.

14. The housing assembly of claim 13 in which said second actuating means further includes a second arm member secured to said cam member and positioned adjacent said latching member when the cam member is in its home position, said second arm member actuating said latching member to a position releasing the display member for movement to an open position exposing the front of the disk drive memory unit in response to the rotation of the cam member through said second predetermined distance.

15. The housing assembly of claim 14 which further includes a second latching member secured to the underside of said cover member and positioned to enable said first arm member to be positioned between the second latching member and the underside of the cover member when the cam member is in the home position thereby locking the cover member in a closed position.

16. The housing assembly of claim 15 in which said display member includes a pair of catch members secured to the rear side of the display member, and said slidably mounted latching member includes a pair of tab portions positioned for engaging said catch members when the cam member is in the home position.

17. The housing assembly of claim 16 in which said second actuating means includes a resilient actuating member engaging said slidably mounted latching member for normally urging said slidably mounted latching member in a direction to enable the tab portions to engage the catch members when the display member is in a viewing position, said slidably mounted latching member including a recessed portion having a first cam surface in which is positioned said second actuating arm member whereby upon movement of said cam member through said second predetermined distance, said second actuating arm member engages said first cam surface thereby sliding the slidably mounted latching member against the action of said resilient member to a position releasing the display member for movement from a viewing position.

18. The housing assembly of claim 17 in which said second actuating arm member includes a depending stud member positioned within said recesses portion, said stud member being moved to a position adjacent said first cam surface during movement of the cam member through said first predetermined distance and engaging said first cam surface during the movement of the cam member through said second predetermined distance.

19. The housing assembly of claim 18 in which said first and second predetermined distances comprise consecutive substantially 45° rotational movements in the same direction.

* * * * *